Jan. 16, 1962 W. BARNEY 3,017,564
PROTECTIVE CIRCUIT
Filed Aug. 12, 1954

INVENTOR.
WALTER BARNEY
BY Elliott & Pastoriza
ATTORNEYS

United States Patent Office 3,017,564
Patented Jan. 16, 1962

3,017,564
PROTECTIVE CIRCUIT
Walter Barney, 4106 W. Burbank Blvd., Burbank, Calif.
Filed Aug. 12, 1954, Ser. No. 449,413
5 Claims. (Cl. 323—9)

This invention relates to a protective circuit for connection between an electrical source and a load.

In applying a load to an electrical source without a protective circuit, the full voltage of the source is instantaneously thrown across the load. As a consequence, the operating life of certain types of electrical equipment is oftentimes adversely affected. The usual way of protecting the equipment is to use either a resistance network or transformer device to reduce the voltage initially reaching the load. Any protective circuit employed must additionally have variable means for increasing the voltage to the load as it stabilizes towards its normal operating condition. A variety of devices have been developed to meet this problem, particularly in connection with industrial type loads. However, the circuits have been relatively complex, thus, requiring rather bulky and expensive apparatus. With the increased use of small electrical loads, such as are common in residential requirements, a need has developed for a protective circuit with a minimum number of elements.

It is an object, therefore, of the present invention to provide a simple protective circuit, particularly adaptable to the smaller electrical loads in residential applications.

Another object is to provide a protective circuit, the elements of which can be manufactured and assembled at a cost substantially below protective apparatuses incorporating circuits now known.

Another object is to provide a protective circuit which acts to gradually increase the voltage to the load in a completely automatic manner.

These and other objects and advantages of the invention are accomplished by providing curernt limiting means in series with the load and a conductive circuit arranged to shunt the current limiting means. Relay means are provided to close the conductive circuit, after a given period of time, in response to the application of the load. Preferably, the current limiting means acts to both decrease the initial voltage to the load, and to cause this voltage to gradually increase until the conductive circuit is established.

A better understanding of the invention will be had by reference to the accompanying drawings, in which.

Figure 1:
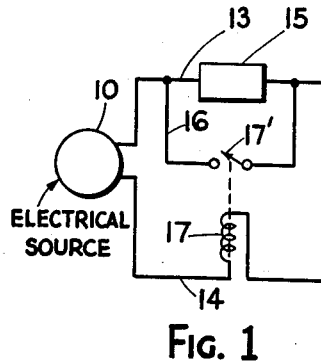
FIG. 1 is a diagram of a preferred form of protective circuit according to this invention.

The protective circuit of FIG. 1 is shown connected between an electrical source 10 and a pair of output terminals 11 to which a load 12 may be applied.

This protective circuit includes lines 13 and 14. In line 13, in series with the load is current limiting means comprising a "thermister" type element 15. Such electrical elements are known in the art to have a negative temperature coefficient of resistance; that is, a characteristic of decreasing resistance with increasing temperature. There is also shown connected to line 13 a conductive circuit 16 adapted to shunt the "thermister" type element 15.

In line 14, in series with the load, is a relay coil 17.

Its associated normally open contacts 17' are in the conductive circuit 16.

In operation, when the load is applied to terminals 11, a small current will initially flow from the electrical source 10 through line 13, the "thermister" type element 15, the load 12, back through line 14, and relay coil 17 to the electrical source. The magnitude of the current will be limited by the relatively high resistance of the "thermister" type element 15, which is at ambient temperature when the load is applied. As current flows through the "thermister" type element, it will be electrically heated, and its resistance will, consequently, decrease. As its resistance decreases, more curernt will flow through the circuit, and gradually increasing voltage will be applied to the load. At the end of a pre-established time, enough current will be flowing to energize relay coil 17, and it will close its associated contacts 17'. When contacts 17' are closed, conductive circuit 16 will be closed to shunt the "thermister" type element and apply substantially full voltage to the load. Relay coil 17 remains in series with the load, but it is designed to have a negligible impedance (or resistance on D.C. applications) so that it will not interfere with the operation of the load.

At the time conductive circuit 16 is closed, "thermister" type element 15, which is then shunted, will begin to cool back to the ambient temperature and its state of high resistance. Therefore, upon reapplication of the load, it will be effective to again limit the initial inflow of current.

Figure 2:
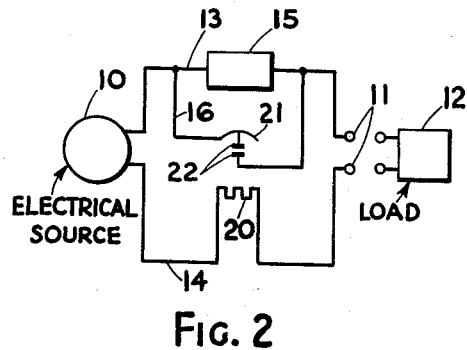
FIG. 2 illustrates another embodiment of the protective circuit.

In the protective circuit of FIG. 2, the same numerals as in FIG. 1 have been used to designate similar components. In this embodiment, the relay coil 17 and its associated contacts 17' of FIG. 1, are replaced by heating coil 20 in series with the load and heat responsive means in the conductive circuit 16. The heat responsive means comprise a bi-metallic element 21 in receptive relationship to heating coil 20 and normally open contacts 22 positioned to be mechanically actuated upon movement of the bi-metallic element 21. Preferably, the bi-metallic element is of the snap-acting or disc type.

Figure 3:
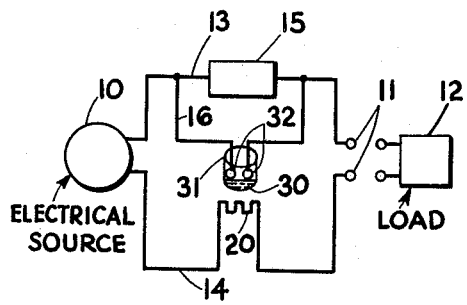
FIG. 3 represents a modification of the protective circuit of FIG. 2.

A modification of the protective circuit of FIG. 2 is shown in FIG. 3. Except for the particular heat responsive means, the protective circuits of FIGS. 2 and 3 are substantially the same. In FIG. 3, the heat responsive means includes a pool of heat expandable, current conducting liquid 30 (for example, mercury) in a chamber 31 placed in receptive relationship to heating coil 20. Normally open contacts 32 are suspended in chamber 31 a short distance from the pool of liquid 30.

The operation of the protective circuits in FIGS. 2 and 3 is essentially the same. When the load is applied to terminals 11, current will flow through line 13 and the "thermister" type element 15, and back through line 14 and the heating coil 20. As in the case of FIG. 1, the "thermister" type element will cause a gradual increase of current. At the end of a pre-set time, heating coil 20 will have reached a sufficiently high temperature to actuate the heat responsive means. At this time, in FIG. 2, the bi-metallic element 21 will move to close contacts 22. Similarly in FIG. 3, the pool of liquid 30 will expand to bridge contacts 32. In each instance the conductive circuit 16 will be closed, as described in FIG. 1.

In the protective circuits shown in FIGS. 2 and 3, the "thermister" type element may be replaced by any current limiting means. A gradual building up of current and voltage to the load is desirable in most instances; consequently, a "thermister" type element is shown in these figures. In certain applications, however, only a "one-step" resistance is needed. In such cases, the "thermister" type element may be replaced by a common resistance network, which will keep the current and voltage to the load at a low value for a given time until the conductive circuit 16 is closed.

In order that the resistance of heating coil 20, in FIGS. 2 and 3, will not affect the operation of the load, the bi-metallic element 21 and pool of liquid 30 are designed to have a sensitivity receptive to a small increase in tempreature; thus, the heating coil may be correspondingly designed to have a relatively low resistance value.

Figure 4:
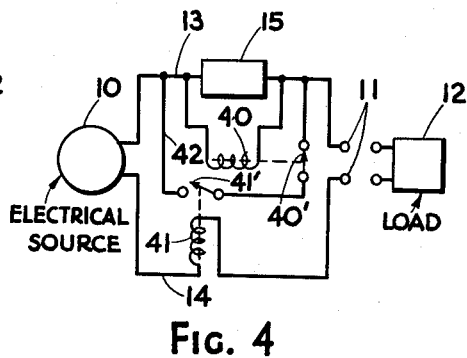
FIG. 4 is a diagram of another embodiment of the protective circuit.

Referring now to FIG. 4, a two relay protective circuit is shown. Elements similar to those described in FIG. 1 have been denoted by the same numerals. Connected to line 13, paralleling the "thermister" type element 15, is a relay coil 40. In line 14, in series with the load, is relay coil 41. Also connected to line 13 and adapted to shunt both relay coil 40 and "thermister" type element 15 is a conductive circuit 42. In conductive circuit 42 are normally closed contacts 40' of relay coil 40, and normally open contacts 41' of relay coil 41.

In operation, when the load is applied to terminals 11, a current will flow through line 13, the "thermister" type element 15 and the relay coil 40, in parallel, and back through line 14 and the relay coil 41. Almost instantaneously thereafter, relay coil 40 will open its associated contacts 40', and relay coil 41 will close its associated contacts 41'. Relay coil 40 is designed to have a high impedance (or resistance in D.C. applications) to avoid appreciable shunting of "thermister" type element 15. Also, relay coil 40 is designed to operate its contacts 40' to an open position before relay coil 41 operates its associated contacts 41' to a closed position, thus assuring that conductive circuit 42 remains open at this time. As resistance of the "thermister" type element 15 decreases, as described in connection with FIG. 1, an increasing amount of current will flow through the circuit including the "thermister" type element, and a decreasing amount of current will flow through the relay coil 40. At the end of a given time, relay coil 40, consequently, will be sufficiently deenergized to enable its associated contacts 40' to return to their normally closed position. At this instant, the conductive circuit 42 will be closed (since contacts 41' are at this time in a closed position) and substantially full voltage will be applied to the load.

As in the relay coil 17 of FIG. 1, relay coil 41 is designed to have negligible impedance (or resistance in D.C. applications) such that it will not appreciably affect the operation of the load.

Once conductive circuit 42 is established, "thermister" type element 15 and relay coil 40 will be effectively shunted out of the circuit. As in FIG. 1, "thermister" type element 15 will then begin to cool back to ambient temperature preparatory to a subsequent reapplication of the load.

Figure 5:
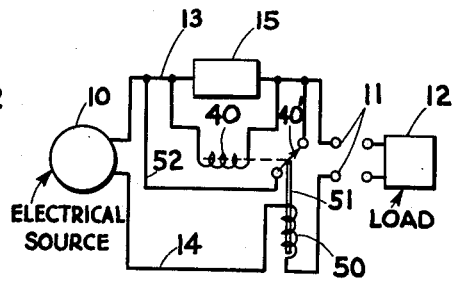
FIG. 5 is a diagram of still another embodiment of the circuit.

In FIG. 5, another protective circuit is shown incorporating the relay coil 40 and its associated normally closed contacts 40', as described in connection with FIG. 4, but which is otherwise different in operation. Again the same numerals as in FIG. 1 have been used to identify similar components. In this embodiment, in line 14 in series with the load, is a solenoid coil 50 having a core 51. Connected to line 13, and adapted to shunt the "thermister" type element 15 and the relay coil 40 is a conductive circuit 52, which as in the protective circuit of FIG. 4, includes normally closed contacts 40'.

The operation of this protective circuit is somewhat different from the other embodiments. When the load is applied to terminals 11, current will flow (as in FIG. 4) through the line 13, the "thermister" type element 15 and the relay coil 40, in parallel, and back through line 14 and the solenoid coil 50. In addition, however, current will also flow for an instant through conductive circuit 52, since contacts 40' are in a closed position. During this instant, solenoid coil 50 will be energized.

The core 51 is positioned to mechanically actuate contacts 40'; consequently, when solenoid coil 50 is energized, core 51 will be thrown against the arm of contacts 40' to open the same. Relay coil 40, which is also energized, will hold the contacts in an open position.

It would appear that "thermister" type element 15 and relay coil 40 would be shunted by the conductive circuit 52 and full voltage thrown on the load when the terminals 11 are closed. However, by carefully selecting the design of solenoid coil 50, the core 51 will actuate contacts 40' almost simultaneously with the application of the load so that conductive circuit 52 is opened before the maximum value of the initial current surge can affect the load.

Continuing with the operation, the resistance of "thermister" type element 15 will gradually decrease, as in FIG. 4, until the current through relay coil 40 has reached such a low value that it will be de-energized, and its associated contact 40' will be biased back to their normally closed position. It is evident that the spring or other force biasing contacts 40' to their normally closed position must be sufficient to overcome the electrical force of solenoid coil 50 (which remains in the circuit) as manifested in core 51. Although this condition exists, core 51 will still open contacts 40' in its initial movement, since at that time it has an added force of its accelerated mass.

When contacts 40' return to their normally closed position, conductive circuit 52 will be closed, and the load, as in the previous embodiments, will be taking substantially full voltage. Solenoid coil 50 is also designed to have a value of impedance (or resistance in a D.C. application) such that it will not appreciably affect the voltage reaching the load.

It will be appreciated from the above description that the various protective circuits of the present invention are simple in operation and may be manufactured and assembled at minimal cost. Further, the use of such protective circuits will adequately protect electrical equipment from initial voltage surges from regulated electrical sources.

The protective circuits which have been described are not meant to limit the scope and spirit of this invention to the particular details set forth.

I claim:

1. A protective circuit for connection between an electrical source and a load, comprising, in combination: an electrical element having a resistance which gradually decreases in response to current passing therethrough, said element being adapted for connection in series with said load such that all current initially supplied to said load passes through said element whereby said current gradually increases; a conductive circuit adapted to shunt said electrical element; and relay means connected in series with said load and said element and responsive to a given value of said current passing through said electrical element for closing said conductive circuit a given length of time after application of said load.

2. An apparatus according to claim 1, in which said relay means comprises: a relay coil in series with said load having contacts in a normally open position in said conductive circuit, said contacts being closed by said relay coil after said given length of time.

3. An apparatus according to claim 1, in which said relay means comprise: a pair of normally open contacts in the conductive circuit; a heating coil in series with the load; and heat responsive means actuated by said heating coil after said given period of time, to close said normally open contacts.

4. An apparatus according to claim 3, in which said heat responsive means comprise: a chamber, one portion of said chamber encircling said pair of contacts, another portion of said chamber holding a heat expansible, current conducting fluid, said fluid expanding and bridging the pair of contacts after said given period of time.

5. An apparatus according to claim 3, in which said heat responsive means comprises: a bi-metallic element positioned near one of the normally open contacts, and acting to close said pair of contacts after said given period of time.

References Cited in the file of this patent

UNITED STATES PATENTS

| | | |
|---|---|---|
| 779,875 | Shattner et al. | Jan. 10, 1905 |
| 809,878 | Wilson | Jan. 9, 1906 |
| 1,649,391 | Davis | Nov. 15, 1927 |
| 1,806,796 | Gates | May 26, 1931 |
| 2,177,832 | Knos | Oct. 31, 1939 |
| 2,646,489 | McArron | July 21, 1953 |

FOREIGN PATENTS

| | | |
|---|---|---|
| 371,084 | Great Britain | Apr. 21, 1932 |
| 807,105 | France | Oct. 12, 1936 |